United States Patent [19]
Bruckert et al.

[11] Patent Number: 5,640,431
[45] Date of Patent: Jun. 17, 1997

[54] METHOD AND APPARATUS FOR OFFSET FREQUENCY ESTIMATION FOR A COHERENT RECEIVER

[75] Inventors: Eugene J. Bruckert, Arlington Heights; Fuyun Ling, Hoffman Estates; Thomas A. Sexton, Schaumburg, all of Ill.

[73] Assignee: Motorola, Inc., Schaumburg, Ill.

[21] Appl. No.: 402,260

[22] Filed: Mar. 10, 1995

[51] Int. Cl.⁶ .................. H04K 1/00; H03L 7/06
[52] U.S. Cl. .................. 375/344; 375/208; 375/343; 455/136
[58] Field of Search .................. 375/200, 201, 375/208, 209, 210, 344, 346, 349; 327/113; 331/40; 332/126; 334/29; 342/199; 348/536, 735; 381/98; 455/71, 75, 136, 139, 255

[56] References Cited

U.S. PATENT DOCUMENTS

| | | | |
|---|---|---|---|
| 5,109,390 | 4/1992 | Gilhousen et al. | 375/200 |
| 5,181,225 | 1/1993 | Neeser et al. | 375/200 |
| 5,214,669 | 5/1993 | Zarembowitch | 375/200 |
| 5,329,547 | 7/1994 | Ling | 375/206 |
| 5,377,227 | 12/1994 | Hurlbut et al. | 375/200 |
| 5,430,759 | 7/1995 | Yokev et al. | 375/202 |

OTHER PUBLICATIONS

Irvine, Garrick T., "Symbol–Aided Plus Decision–Directed Reception for PSK/TCM Modulation on Shadowed Mobile Satellite Fading Channels", IEEE Journal on Selected Areas in Communications, vol. 10, No. 8, Oct. 1992, pp. 1289–1299.

*Primary Examiner*—Tesfaldet Bocure
*Assistant Examiner*—Bryan Webster
*Attorney, Agent, or Firm*—Richard A. Sonnentag; Kevin A. Buford

[57] ABSTRACT

A method and apparatus for improved offset frequency estimation includes in a first embodiment a receiver (100) for coherent reception of a signal having known reference information, the receiver including an extractor (106) for extracting the reference information (107) from the signal, and an offset frequency estimator (110). The offset frequency estimator (110) includes a filter (121) for filtering the reference information and outputting a filtered reference sequence; a correlator (122, 124) for correlating the filtered reference sequence against a predetermined reference signal to form correlation values; and a peak detector (126) for determining an offset frequency estimate (131) from the correlation values. Other embodiments are also shown.

20 Claims, 3 Drawing Sheets

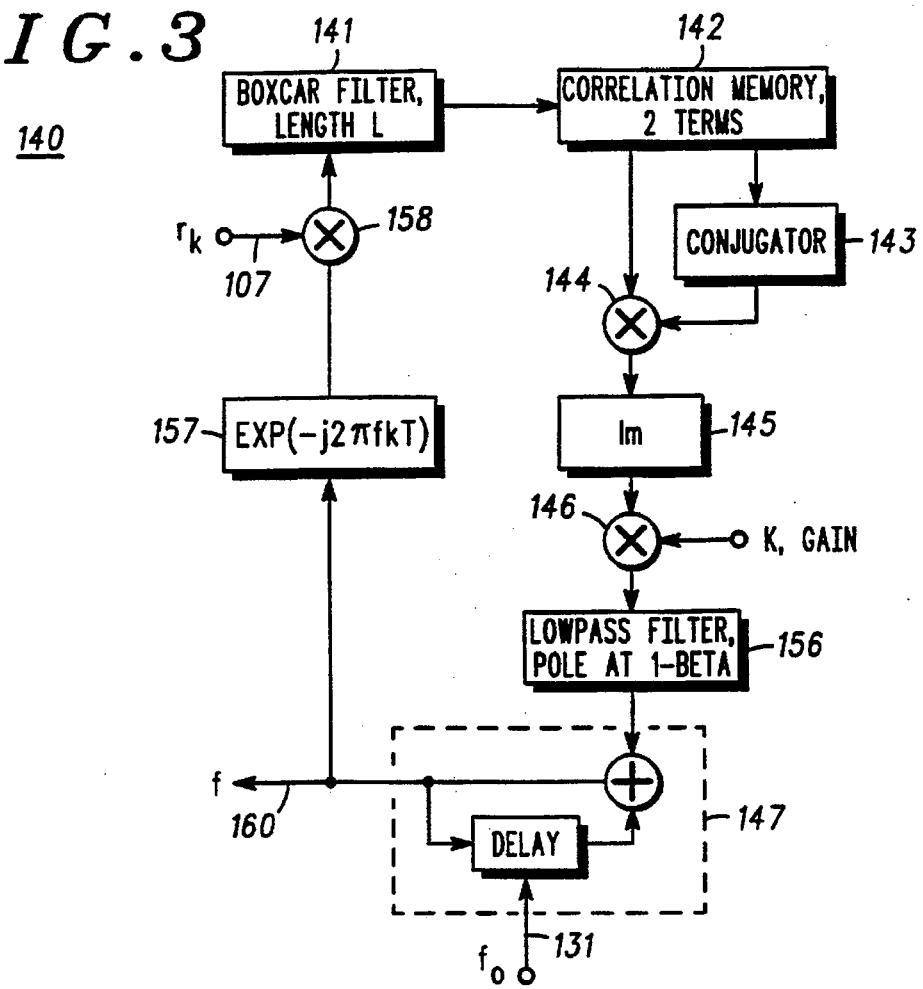
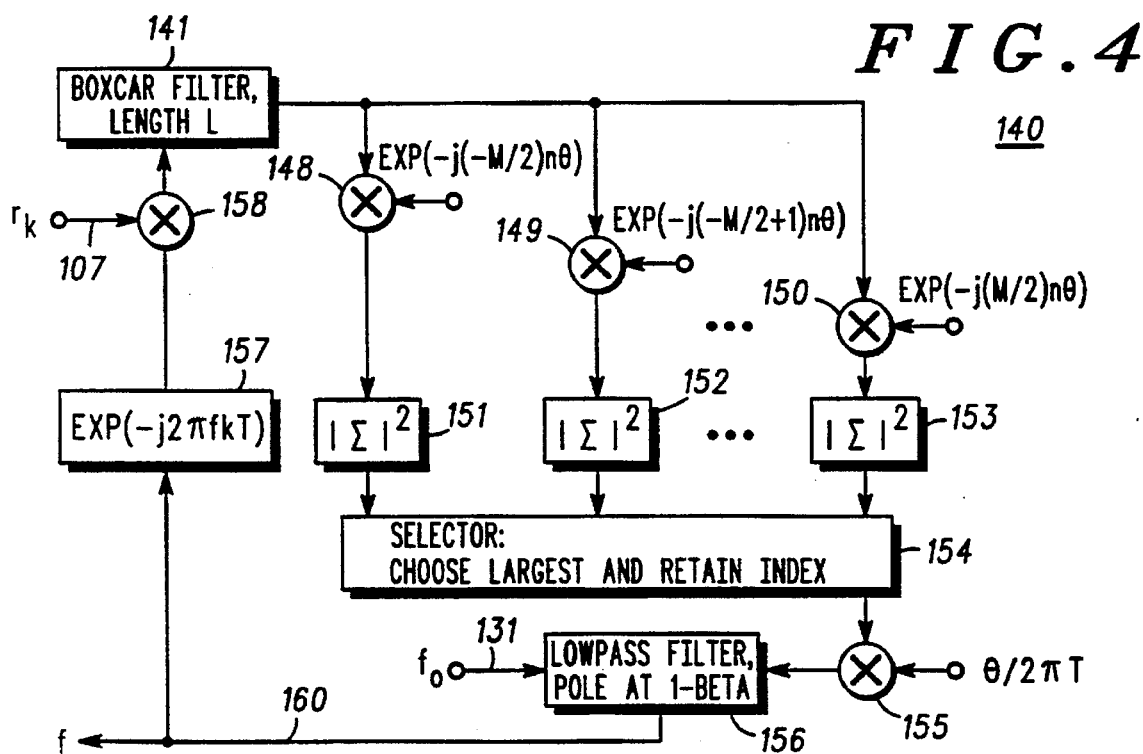

1

METHOD AND APPARATUS FOR OFFSET FREQUENCY ESTIMATION FOR A COHERENT RECEIVER

FIELD OF THE INVENTION

The present invention relates, in general, to communication systems and, more particularly, to a method and apparatus for offset frequency estimation for a coherent receiver of a communication system.

BACKGROUND OF THE INVENTION

Communication systems take many forms. One type of communication system is a multiple access spread-spectrum system. In a spread-spectrum system, a modulation technique is utilized in which a transmitted signal is spread over a wide frequency band within the communication channel.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio usually expressed as error bits per noise density (i.e., $E_b/N_0$ which is defined as the ratio of energy per information-bit to noise-spectral density), to recover the signal at the cost of expending more bandwidth than would otherwise be necessary to transmit the data signal. For example, Walsh code words can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using non-coherent reception techniques. It will be appreciated by those skilled in the art that a coherent receiver requires less signal to noise ratio (in $E_b/N_o$) than that required by a non-coherent receiver having the same bit error rate (i.e., a particular design constraint denoting an acceptable interference level). Roughly speaking, there is a three decibel (dB) difference between them for the Rayleigh fading channel. The advantage of the coherent receiver is more significant when diversity reception is used, because there is no combining loss for an optimal coherent receiver while there is always a combining loss for a noncoherent receiver.

One such method for facilitating coherent detection of transmitted signals is to use a pilot signal. For example, in a cellular communication system the forward channel, or down-link, (i.e., from base station to mobile unit) may be coherently detected, if the base station transmits a pilot signal. Subsequently, all the mobile units use the pilot channel signal to estimate the channel phase and magnitude parameters. However, for the reverse channel, or up-link, (i.e., from mobile to base station), using such a common pilot signal is not feasible. As a result, those of ordinary skill in the art often assume that only non-coherent detection techniques are suitable for up-link communication.

A solution for the need for a coherent up-link channel is found in U.S. Pat. No. 5,329,547 to Fuyun Ling, commonly assigned together with this application to Motorola, Inc. This patent discloses the introduction of reference bits into the information datastream prior to spreading and transmission, and the subsequent extraction of these reference samples and their use in forming an estimate of the channel response. This estimated channel response is in turn used to coherently detect estimated data symbols.

While this solution allows for coherent detection, it assumes that more or less standard phase-locked loops (PLL's) are used for frequency offset estimation. However, such techniques do not fully exploit the known synch pattern.

Phase locked loops, or PLLs, are well known in the art. A PLL circuit is usually formed as a phase detector fed by input and feedback signals, a loop filter and a voltage controlled oscillator for producing a sine wave (i.e., the feedback signal). A basic PLL compares its estimated frequency, the sine wave, with the noisy input signal using a phase detector. An ideal phase detector followed by a loop filter will form a noisy estimate of the phase difference between the input and the VCO (voltage controlled oscillator) output. The VCO thus acts on the loop filter output to create the PLL estimate of a sinewave with the phase (and thus frequency) of the input.

While an elemental PLL is reasonably good at tracking phase for most applications, it is not as good at acquiring or tracking signals with large frequency errors. A PLL is characterized by a pull-in range $B_p$. However, as $B_p$ increases, so does the variance of the phase error. AFC (automatic frequency control) units, FLLs (Frequency Lock Loops), or PLL's with phase and frequency detectors are often used to track such signals. These circuits typically produce an estimate of the average input frequency only, and additionally require an elemental PLL if the phase is to be acquired. However, in wireless communications AFC design has been constrained by circuit complexity, so system designs have typically made frequency accuracy constraints somewhat loose to avoid prohibitive costs in complexity or processing requirements.

However, with the introduction of more optimal modulation schemes such as QPSK (quaternary phase shift keying), more precise frequency estimates—within 30–60 Hz (Hertz)—are often needed. This is particularly true of applications such as coherent reception of DS-CDMA (direct sequence code division multiple access) spread spectrum signals, where the signal to noise ratio of the samples containing the frequency information is around 0 decibels (dB) (i.e., noise power equals signal power), and the frequency error may be ±1000 Hz or more before correction. These frequency errors may arise, for example, from the transmitter/receiver clock not being perfectly locked due to inaccuracies in the crystal oscillator, as well as from large Doppler frequency shifts (such as from vehicles moving at high speeds in open spaces). Coherent DS-CDMA systems such as that described in U.S. Pat. No. 5,329,547 and co-pending U.S. application "Method and Apparatus For Coherent Communication Reception in a Spread-Spectrum Communication System" by Ling et al., filed Feb. 28, 1994, and commonly assigned together with this application to Motorola, both of which are incorporated herein by reference, allow about 200 ms or less for initial acquisition and need the error after acquisition to be less than 100 Hz. However, at such wide frequency deviations in such short time periods, a typical AFC or PLL would not be able to lock on or track the signal being received with any reasonable degree of accuracy. There thus remains a need for an improved AFC/PLL which compensates for these and other problems.

BRIEF DESCRIPTION OF THE DRAWINGS

FIG. 3 is a functional block diagram of a presently preferred embodiment of tracking circuit 140 of FIG. 1;

FIG. 4 is a functional block diagram of an alternative embodiment of tracking circuit 140 of FIG. 1;

DETAILED DESCRIPTION OF THE DRAWINGS

These and other problems are solved by an improved offset frequency estimation approach according to the invention. A presently preferred embodiment of the invention is an offset frequency estimator, following a reference information extractor for extracting reference samples from a received signal. The offset frequency estimator preferably has an acquisition circuit that first filters the reference information (to form a filtered reference sequence), then correlates the sequence against a predetermined reference signal (e.g., a sequence or family of candidates in a DFT (discrete Fourier transform) correlator). The output correlation values are then used in determining an offset signal characteristic estimate (e.g., an offset frequency estimate); in the case of DFT processing, the index (e.g., a predetermined value corresponding to a time rate of phase change measure) of the peak output, detected in a peak detector, is passed to a lowpass filter. The output of the lowpass filter is an initial frequency estimate, $f_0$. When in tracking mode (after the received signal has been initially acquired), the reference symbol stream is inputted to a filter and the filtered sequence (or sample in this case) correlated against a prior sample to determine the phase rotation in a predetermined time interval. The result is lowpass filtered, adjusted according to a prior estimate, yielding a frequency estimate f. Alternative embodiments are also discussed below. Through the use of this improved AFC, faster acquisition and tracking than was possible with prior art methods can be achieved, as well as pilot/preamble signal detection, while still maintaining precise frequency estimates.

In the course of the following discussion, an improvement for DS-CDMA cellular communication is presented. This approach employs coherent-detection with reference-symbol based channel estimation, and in particular employs improved frequency estimation techniques to optimally detect the received signal. It will be appreciated by those skilled in the art that other types of communication systems (e.g., personal communication systems, trunked systems, satellite communication systems, data networks, and the like) may also be adapted and/or designed to use the principles described herein.

Figure 1:
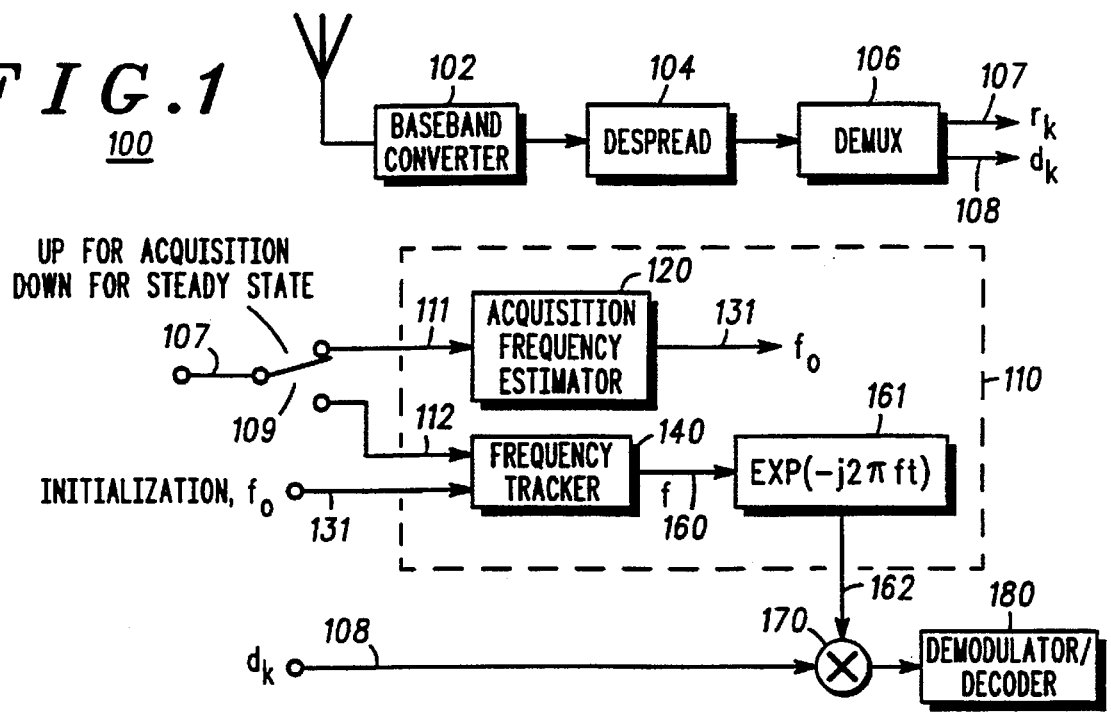
FIG. 1 is a functional block diagram of a first embodiment of a receiver and offset frequency estimator 110 according to the invention.

Turning then to FIG. 1, a presently preferred embodiment of a coherent receiver 100 is shown. A baseband converter 102 receives a reference symbol encoded spread spectrum signal via the antenna of the receiver 100, and downconverts the signal for further processing at baseband frequencies. Despreader 104 next despreads the signal, and the reference samples 107 are extracted from the signal by reference sample extractor/demultiplexer 106. The reference samples 107 are then fed to frequency estimator/AFC 110, while the data samples are appropriately delayed for phase rotation by the frequency offset correction output from AFC 110.

During initial acquisition, the reference samples 107 are routed via switch 109 as input 111 to acquisition frequency estimator 120. Acquisition frequency estimator 120, described more fully below, determines an initial frequency estimate $f_0$ 131, which is fed to frequency tracker 140.

The inserted reference symbols can be organized in blocks or uniformly distributed. For a flat fading channel, it is desirable to insert reference symbols periodically and uniformly in the data stream. For a DS-CDMA up-link with a RAKE receiver for frontend processing, one can treat the output of each RAKE "finger" as being a flat faded signal. Thus, the preferred embodiment communication system will uniformly insert one reference symbol for every Y coded data symbols. Upon acquisition switch 109 couples reference symbols 107 to frequency tracker 140 via input 112. Frequency tracker 140, also described more fully below, determines a frequency offset estimate f 160 based on both $f_0$ 131 and reference sample input 112. The frequency offset estimate 160 is then converted in circuit 161 and fed as frequency correction signal 162 to mixer 170. Mixer 170 serves to adjust the phase/frequency of the data samples 108 prior to processing by demodulator/detector 180.

Figure 2:
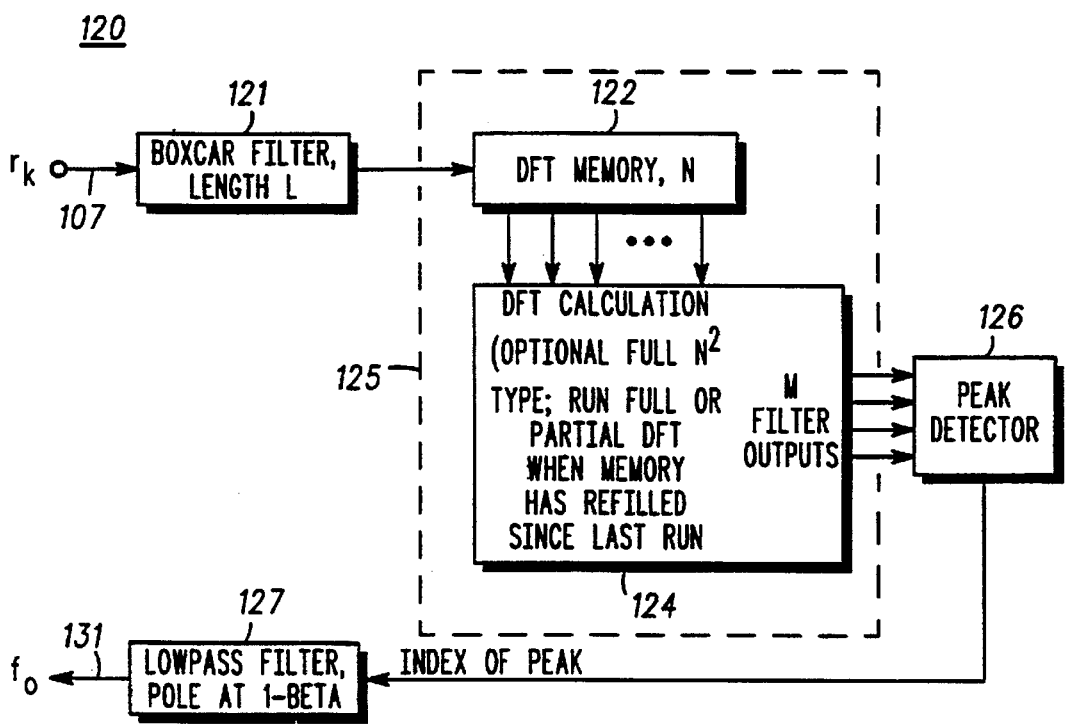
FIG. 2 is a functional block diagram of a presently preferred embodiment of acquisition circuit 120 of FIG. 1.

FIG. 2 illustrates a preferred embodiment of acquisition frequency estimator 120. The reference samples 107 are first filtered so as to effect averaging, and thus reduce aliasing in the downsampled output of filter 121, since the overall despread bandwidth is several times wider than the reference sample bandwidth. Preferably, the boxcar filter 121 operates with a length L over the reference samples 107. For example, if there are 96 reference samples per despread frame, the filter is set to average every L, e.g., L=3, samples and so output a sequence of 32 averaged reference samples. A skilled artisan should appreciate that while a boxcar filter is simple to implement here, other filters may also be employed.

The output of filter 121 (e.g., the 32 sample filtered reference sequence) is fed to DFT (discrete Fourier transform) memory 122, and then to DFT estimator 124, which together form correlator 125. DFT estimator 124 performs a partial DFT calculation (i.e., the number of DFT operations may be less than the memory length N) on the DFT memory 122 output. A set of frequencies is selected which span the signal space occupied by the received reference samples, making a basis set representation of the original noisy faded reference sequence and also defining a predetermined unit of time. The sequence of candidates (which are represented by powers of $e^{-ji\Theta}$ in equation 1 where the power referred to is m) are, of course, noiseless, and each has a different (e.g., greater) increase in phase per unit time than the preceding candidate. The basis functions are each correlated with the filtered reference sequence, to form correlation values for each candidate. The candidate corresponding to the peak correlation value is chosen as the best estimate of the segment of same frequency and greatest energy component of the received signal, with the time rate of phase change of the corresponding candidate providing the frequency offset estimate of the signal. For the following, we dispense with further mention of boxcar filter 121 and denote the contents of DFT memory $r_k$. This use of $r_k$ as memory contents follows for later circuits. Put differently, the DFT estimator output, $D_m$, may be expressed $$D_m = \sum_{i=1}^{N} w_i r_i e^{-jim\Theta} \quad \text{(eq. 1)}$$

where m=0, ..., M−1, M is the number of filters, $w_i$ is a window function, and $\Theta$ is the root parameter of the transform (e.g., $2\pi$ divided by the number of points (N) in the DFT memory) giving the filter positions at frequencies m$\Theta$/T (T is the time between sample k−1 and k). Recall that at time k, the received signal 107 $r_k$ has a desired part $s_k$ with channel gain $\alpha_k$ and noise $n_k$ (i.e., $r_k = \alpha_k s_k + n_k = A_k e^{j\theta_k}$, with k=1, ..., N). DFT estimator 124 operates as a family of narrowband filters of sufficient bandwidth and quantity to span the possible frequencies of received waveforms, with the equivalent filter outputs being undersampled since only the envelope of the result is needed. In other words, for N=32 and M=32, for each possible index m (=0 through 31) a correlation is performed of $r_1$ through $r_{32}$, so $D_m=[r_1(\cos(1 \, m\Theta)+j\sin(1 \, m\Theta)]+\ldots+[r_{32}(\cos(32m\Theta)+j\sin(32m\Theta)]$. The output $D_m$ for all 32 values is compared, with the index (say, 9) of the peak summed value giving the offset frequency value of 9$\Theta$/T.

A skilled artisan will appreciate how to optimize the DFT estimator 124. The overall bank resolution may also be improved by optimizing the window function w. Further, to do a low resolution search with fewer filters, the bandwidth may be increased and the filter center frequency separation increased by increasing $\Theta$ (and reducing M) (one such approach is shown in FIG. 4). Also, the individual filter bandwidths may be varied (e.g., to compensate for the level of uncertainty in the frequency error) by adjusting the span N of DFT Memory 122. Moreover, this formulation (other than the number of filter banks and sequence observation length, N) may be efficiently implemented as a FFT (fast Fourier transformer). Finally, a skilled artisan will appreciate that the linearity of the DFT estimator is necessary for good performance at 0 or negative SNR (signal to noise ratio) with limited observation time N.

After each computation of DFT estimator 124, the output set D is fed to peak detector 126. The index m of the filter with the peak energy value is determined (i.e., $D_m$=max (over M) $|D_m|$), and this index m' is filtered by filter 127 to reduce the effects of noise.

This blending of the old frequency estimate with the new information by filter 127 (i.e., m' at time k) is done based on the possible rate of frequency change and the time varying noise variance. The output is the initial frequency estimate $f_o$ 131=(m')$\Theta$/(2$\pi$T) Hz.

One skilled in the art should recognize that this DFT approach may be advantageously used in applications such as preamble or pilot signal detection, as well as signals for which tracking has been lost. It should be noted that the DFT estimator 124 may also operate on unknown received data. In such cases, the data bit values must be made transparent (e.g., by squaring for a BPSK (binary phase shift keyed) signal or raising to the $4^{th}$ power for a QPSK signal. The reference sample-based estimates and the data-based estimates could then be blended using knowledge of process information (estimate confidence level, etc.)

Turning now to FIG. 3, a preferred embodiment of frequency tracker 140 is shown. Upon initial acquisition, switch 109, (see FIG. 1) switches so as to input reference samples 107 to input 112 of frequency tracker 140. The reference samples are similarly filtered, preferably by boxcar filter 141 of length L. A filtered signal (e.g., one member of the 32 member filtered sequence of FIG. 2) is then fed to correlator memory 142, which has 2 terms, so as to output the filtered reference signal to conjugator 143, and a delayed replica of the signal for correlation (in mixer 144) against the signal's conjugate (determined from the signal by conjugator 143). The correlated signal is then processed in block 145 to reduce the complex input to its imaginary component, and this is mixed in mixer 146, which sets the designed tracking loop gain K. The adjusted correlation value output is then filtered by lowpass filter 156, where (1−$\beta$) is the position of the filter pole on the real axis of the z plane. The angle of the output, $r_k$ $(r_{k-1})^*$, determines the scaled estimated of the frequency of the offset, $B_k$. Theoretically, $B_k$ should equal the angle of the expectation E $\{r_k \, (r_{k-1})^*\}$, but the value of $B_k$ as a practical matter is preferably determined by $B_k=B_{k-1}(1-\beta)+(\beta K)\text{lm}(r_k \, (r_{k-1})^*)$. $B_k$, the filtered adjusted correlation output, is then preferably integrated in lossless integrator 147 with the prior offset (which, in the case of initial acquisition will be the offset angle of $f_o$), which helps drive the frequency offset error to zero. The output offset frequency estimate 160 is used both for the AFC 110 output, as well as for tuning oscillator 157 to generate a complex sinusoid for one input of mixer 158, for mixing with the next reference sample signal $r_{k+1}$.

It should be appreciated that this approach is non-linear, but is advantageous in requiring fewer computations for determining the frequency at which the signal's 107 energy is greatest. In essence it removes the constant unknown phase angle due to the fading channel of the received signal 107 and retains the phase shift due to frequency offset from one sample to the next. In other words, this fixed lag approach compares the present sample $r_k$ with previous signal samples to determine the rotation in a fixed time.

An alternative way to determine the fixed lag appears to be, at least for an additive noise channel, a linear prediction method. In this approach the error power is minimized (e.g., least mean squared) when comparing the received samples with predicted values. For example, where the signal estimate $(r_k)\hat{}$ is $B_k^* r_{k-1}$, where $e_k = r_k^*(r_k)\hat{}$ and $B_{k+1}=B_k+\mu e_k r_{k-1}$. This method, along with other fixed lag approaches, may be further improved by averaging the reference sample information before entering the non-linear stages, and computing the correlation estimate at less than once per received sample (e.g., replacing $r_k$ with $R_{k \bmod 4}=(r_k+r_{k-1}+r_{k-2}+r_{k-3})$).

FIG. 4 shows a low resolution alternative embodiment of frequency tracker 140, in which the search compared to the acquisition circuit of FIG. 2 may be done with fewer filters (i.e., mixers 148–150, in conjunction with integrator blocks 151–153, respectively, where M is the number of filters and Θ sets the frequency separation, selected so as to give sufficiently small filter spacing so the residual frequency offset error is not missed) and selector 154. Each mixer 148–150 serves to correlate one of a sequence of candidates (each of a differing angular rate of change value) with the filtered reference signal, the correlated outputs being integrated to form quality (e.g., energy) estimates. Selector 154 then selects the best quality estimate and outputs an estimate of the frequency offset of the candidate corresponding to the best quality estimate. Scaler 155 maps the output integer to the frequency in Hz. The bandwidth may thus be increased and filter 156 center frequency separation increased by increasing Θ and reducing M. A principal advantage is that it is more robust over the fixed lag approach of FIG. 3 because of its wider bandwidth and linear processing using correlation with a noiseless candidate.

Figure 5:
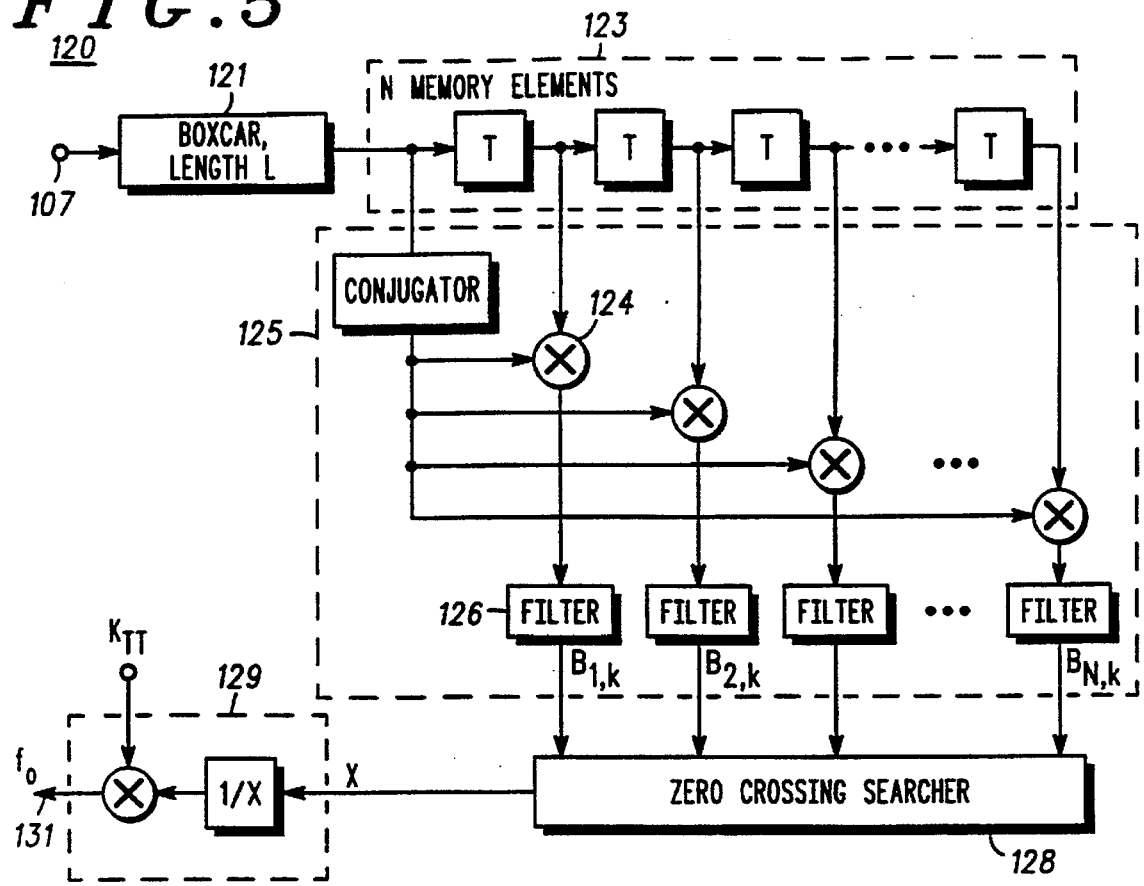
FIG. 5 is a functional block diagram of an alternative embodiment of acquisition circuit 120 of FIG. 1.

FIG. 5 shows an alternative embodiment of acquisition frequency estimator 120, in which a total time correlation is performed. This approach is a time domain approach (as compared with the frequency domain approach using DFT estimator 124), and is in a sense a generalization of the fixed lag correlation embodiment of FIG. 3. Each received signal $r_k$ 107 is filtered by filter 121, the filtered sequence fed to correlator memory 123, and the conjugate of the last (i.e., most recent) member/sample of the sequence is correlated against the previous N received samples in the correlator 125, formed by plural mixer/filter pairs for example, 124 and 125. The filter outputs, considered as a function of time lag value (the $n^{th}$ filter gives the value for lag=n, since the time delay T between members is known) provide an estimate of the received sample's autocorrelation versus lag (or offset). (The output at the first lag 126, is equivalent to the single correlation estimated in the fixed lag approach of FIG. 3). Searcher 128 then performs a search for zero crossings (either of the real or imaginary part, or both), which yields a candidate lag value x, which is based on the known lag amount for the corresponding member of filtered sequence. The reciprocal of this value is then taken and the reciprocal scaled by a predetermined amount $K_{TT}$ (to convert the inverted lag value to Hz) in scaling unit 129. The output is the offset frequency estimate. In this case the estimated correlation values $B_{n,k}$ are equal to $B_{n,k-1}(1-\beta)+\beta r_k(r_{k-n})^*$ where 1−β is, again, the position of the lowpass filter 127 pole on the real axis on the z plane.

Explained differently, the process of the total time correlator of FIG. 5 is based on trigonometry. Consider a faded noisy reference sequence with unknown frequency offset ω, for which the mean square value of the fading process is A:

$$r'_k = \alpha_k e^{j\omega kT} + v_k \quad \text{(eq. 2)}$$

where T is the time between boxcar filter (107) outputs, also shown as the memory element delay in memory 133. The correlation at different lags n may then be computed as follows:

$$\begin{aligned} B(n) &= E\{r'_k r'^*_{k+n}\} \\ &= Ae^{j\omega nT} \\ &= A\cos(\omega nT) + jA\sin(\omega nT) \end{aligned} \quad \text{(eq. 3)}$$

if kT <<the coherence time of the fading channel, and the noise is independent at sampling intervals kT (which applies in this example). Thus, B(n) is simply a complex sinusoid with unknown frequency ω and without noise. The averaging operation performed by elements like filter 125 approximates the expectation shown above, by minimizing the noise and producing the complex sinusoid. An easy way to identify the frequency of the sinusoid is to realize that the real part of B(n) will cross zero at $\omega n_z T=\pi/2$, which is equivalent to saying that the period of ω is $4n_z T$. The imaginary part Asin(ωnT)) will reach a maximum at $\omega n_{max} T=\pi/2$. It is a relatively simple matter to find the first zero crossing in the real part of B(n) and the first maximum in the imaginary part. There will be other zero crossings and maximums which may also be exploited, as one skilled in the art will appreciate, and they will be corrupted with at least partially uncorrelated noise to the estimate given here, so obvious generalizations of this idea will identify other zero crossings to blend into the frequency estimate. The above derivation shows how to find these crossings and their relationship to ω. Without noise $n_z=n_{max}$. Residual post-filtering noise will deviate these, so a final estimate for the unknown frequency should be $$\omega'=4T2\pi(n_z+n_{max})/2, \text{ with } f_0\omega'/2\pi \quad \text{(eq. 4)}$$

For the reduced total time tracker (FIG. 6 below), one simply windows the estimate, i.e., does not compute B(n) at lags distant from the current best zero crossing estimate $n_z$. So, one would compute B(n) for n=nz−5 ... nz+5, or the like, with a window of 10 actively computed lags given as an example. This window may be made larger or smaller depending on one's confidence in the current estimate of ω.

Figure 6:
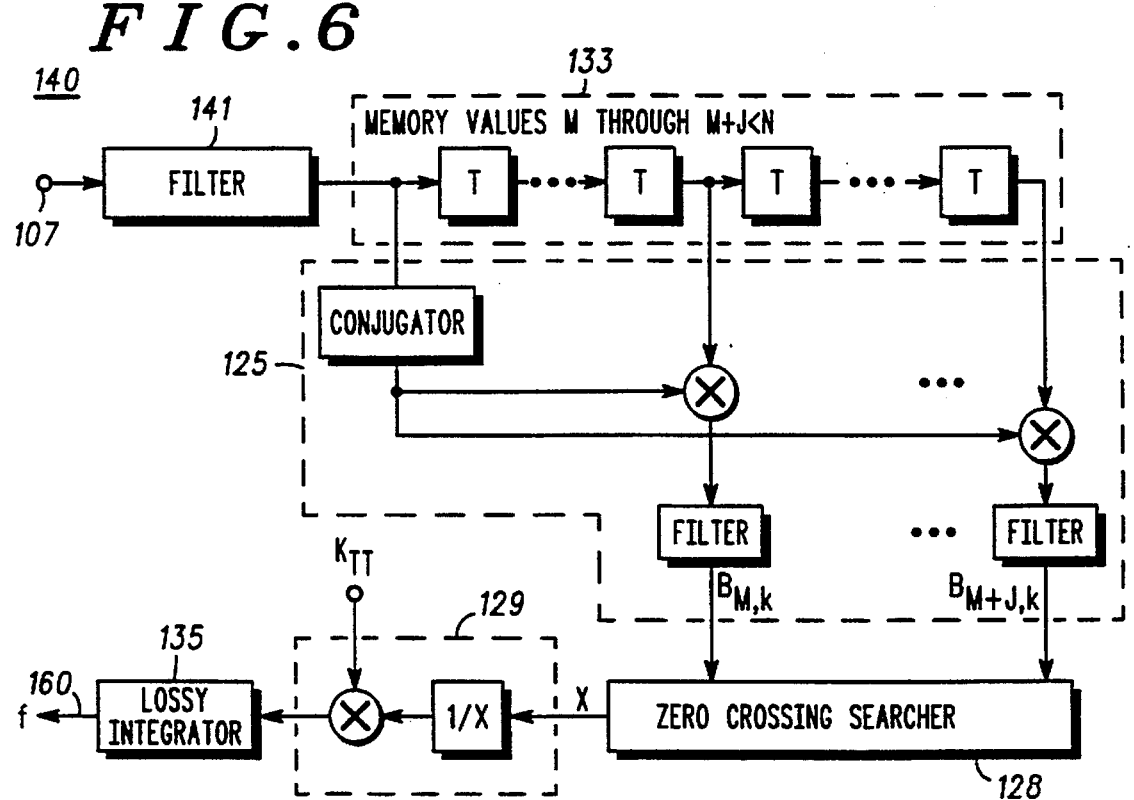
FIG. 6 is a functional block diagram of an alternative embodiment of the offset frequency estimator 110 of FIG. 1.

While FIG. 5 has been shown as an alternative embodiment of acquisition frequency estimator 120, one skilled in the art will appreciate that it can also be readily used for tracking. FIG. 6 shows one such alternative embodiment, which is in fact a logically reduced form of the embodiment of FIG. 5. In FIG. 6 the circuitry is substantially similar to that of FIG. 5, except correlator memory 133 limits the number of outputs to M+J, a subset of the N possible samples used during acquisition by correlator memory 123 of FIG. 5 (i.e., correlator memory 133 is preferably the same unit as correlator memory 123, appropriately configured to only output the M+J past stored samples). The multiplier/filter pairs of correlator 125 and filter 127, and searcher 128, function the same as during acquisition, except only on the (M+J−M=J) samples output by correlator memory 133. While 1 pole filters are considered preferable in FIGS. 5 and 6, more than one pole may also be used. Scaling unit 129 again takes the reciprocal, scaled, of the zero crossing output X, and a lossy integrator 135 sums the noisy frequency estimates so as to minimize the output error. The final output is frequency estimate f 160.

Thus, it will be apparent to one skilled in the art that there has been provided in accordance with the invention, a method and apparatus of frequency estimation for coherent reception of a signal that fully satisfies the objectives, aims, and advantages set forth above. While the invention has been described in conjunction with specific embodiments thereof, it is evident that many alterations, modifications, and variations will be apparent to those skilled in the art in light of the foregoing description. Accordingly, the invention is intended to embrace all such alterations, modifications, and variations within the spirit and scope of the appended claims.

We claim:

1. A method for offset frequency estimation of a received signal having known reference information, the method comprising:

(a) extracting the reference information from the received signal;

(b) filtering the reference information to output a filtered reference sequence;

(c) correlating the filtered reference sequence against a predetermined reference signal to form correlation values, the predetermined reference signal being a sequence of noiseless candidates, each candidate of the sequence of noiseless candidates having a greater increase in phase per a predetermined unit of time than a preceding candidate; and (d) determining an offset signal characteristic estimate from the correlation values.

2. The method of claim 1, wherein
step (c) further comprises correlating each of the candidates against the filtered reference sequence to form a correlation value for each corresponding candidate.

3. The method of claim 2, wherein the offset signal characteristic estimate is an offset frequency estimate, and:
step (d) further comprises detecting a peak correlation value, and determining the offset frequency estimate based on a predetermined value of the candidate corresponding to the peak correlation value.

4. The method of claim 3, wherein the predetermined value is a time rate of phase change measure of the candidate corresponding to the peak correlation value.

5. The method of claim 3, wherein step (c) comprises performing a discrete Fourier transform of the filtered reference sequence.

6. The method of claim 3, further comprising, after the received signal has been initially acquired:

(e) filtering the reference information to output a filtered reference signal and forming a delayed replica of the filtered reference signal;

(f) conjugating the filtered reference signal to form a conjugate signal and correlating the delayed replica with the conjugate signal to form a further correlation value;

(g) filtering the correlation value to form a filtered correlation value and determining an offset angle of the filtered correlation value; and (h) integrating the further correlation value with a predetermined offset angle to form a further offset signal characteristic estimate.

7. The method of claim 6, wherein the predetermined offset angle is the offset signal characteristic estimate.

8. The method of claim 3, further comprising, after the received signal has been initially acquired:

(e) filtering the reference information to output a filtered reference signal;

(f) correlating each of a further sequence of candidates, wherein each of the further sequence of candidates has a different predetermined angular value from each of the others of the further sequence of candidates, with the filtered reference signal to form plural quality estimates; and (g) determining a further offset signal characteristic estimate from the predetermined angular value of a first one of the further sequence of candidates corresponding to a best of the plural quality estimates.

9. The method of claim 1, wherein the filtered reference sequence includes plural members and the predetermined reference signal is a conjugate representation of a last member of the filtered reference sequence, and:
step (c) comprises correlating each of the plural members against the conjugate representation.

10. The method of claim 9, wherein the offset signal characteristic estimate is an offset frequency estimate, and:

step (d) further comprises determining a time lag value from the correlation values, and scaling a reciprocal of the time lag value by a predetermined scaling amount to form the offset frequency estimate.

11. The method of claim 10, wherein determining the time lag value in step (d) further comprises performing a zero crossing search, for each one of the correlation values, for at least one of the group consisting of a real and an imaginary part of said each one of the correlation values, and determining the time lag value based on a known lag amount for at least one member of the filtered reference sequence corresponding to a zero crossing value.

12. The method of claim 10, wherein determining the time lag value in step (d) further comprises performing a zero crossing search, for each one of the correlation values, for at least one of the group consisting of a real and an imaginary part of said each one of the correlation values, determining a known lag amount for each member of the filtered reference sequence which corresponds to a zero crossing value from a last member of the filtered reference sequence, and determining the time lag value based on plural of the known lag amounts.

13. The method of claim 9, wherein, after the received signal has been initially acquired, step (c) comprises correlating only each of a subset of the plural members against the conjugate representation.

14. A receiver for coherent reception of a first signal having known reference information and an extractor for extracting the reference information from the first signal, the receiver including an offset frequency estimator comprising:

(a) filtering means for filtering the reference information to output a filtered reference sequence;

(c) correlating means for correlating the filtered reference sequence against a predetermined reference signal to form correlation values, the predetermined reference signal being a sequence of noiseless candidates, each candidate of the sequence of noiseless candidates having a greater increase in phase per a predetermined unit of time than a preceding candidate; and (d) determining means for determining an offset signal characteristic estimate from the correlation values.

15. The receiver of claim 14, wherein the offset signal characteristic estimate is an offset frequency estimate, and:
the correlating means is further operable for correlating each of the candidates against the filtered reference sequence to form a correlation value for each corresponding candidate; and
the determining means is further operable for detecting a peak correlation value, and determining the offset frequency estimate based on a predetermined value of the candidate corresponding to the peak correlation value.

16. The receiver of claim 15, further comprising:
(e) first filter means for filtering the reference information to output a filtered reference signal and forming a delayed replica of the filtered reference signal;

(f) conjugating means for conjugating the filtered reference signal to form a conjugate signal and correlating the delayed replica with the conjugate signal to form a further correlation value;

(g) second filter means for filtering the correlation value to form a filtered correlation value and determining an offset angle of the filtered correlation value; and (h) integrating means for integrating the further correlation value with a predetermined offset angle to form a further offset signal characteristic estimate.

17. The receiver of claim 15, further comprising:

(e) filter means for filtering the reference information to output a filtered reference signal;

(f) further correlating means for correlating each of a further sequence of candidates, wherein each of the further sequence of candidates has a different predetermined angular value from each of the others of the further sequence of candidates, with the filtered reference signal to form plural quality estimates; and (g) further determining means for determining a further offset signal characteristic estimate from the predetermined angular value of a first one of the further sequence of candidates corresponding to a best of the plural quality estimates.

18. The receiver of claim 14, wherein the filtered reference sequence includes plural members, the predetermined reference signal is a conjugate representation of a last member of the filtered reference sequence, the offset signal characteristic estimate is an offset frequency estimate, and:

the correlating means is further operable for correlating each of the plural members against the conjugate representation; and the determining means is further operable for determining a time lag value from the correlation values, and scaling a reciprocal of the time lag value by a predetermined scaling amount to form the offset frequency estimate.

19. The receiver of claim 18, wherein the correlating means is further operable, after the received signal has been initially acquired, for correlating only each of a subset of the plural members against the conjugate representation.

20. A receiver for coherent reception of a first signal having known reference information and an extractor for extracting the reference information from the first signal, the receiver including an offset frequency estimator comprising:

(a) a filter coupled to the reference signal extractor being operable for filtering the reference information to output a filtered reference sequence;

(b) a correlator coupled to the filter being operable for correlating each of a sequence of candidates, each candidate having a greater increase in phase per a predetermined unit of time than a preceding candidate, against the filtered reference sequence to form a correlation value for each corresponding candidate; and (c) a peak detector coupled to the correlator being operable for determining a peak correlation value from the correlation values and determining an offset frequency estimate based on a predetermined value of the candidate corresponding to the peak correlation value.

* * * * *